United States Patent
Klonowski et al.

(10) Patent No.: US 12,174,952 B2
(45) Date of Patent: Dec. 24, 2024

(54) ADVANCED FILE MODIFICATION HEURISTICS

(71) Applicant: Webroot, Inc., Broomfield, CO (US)

(72) Inventors: Eric Klonowski, Broomfield, CO (US); Sesha Sailendra Chetlur, Boulder, CO (US)

(*) Notice: Subject to any disclaimer, the term of this patent is extended or adjusted under 35 U.S.C. 154(b) by 0 days.

(21) Appl. No.: 18/170,421

(22) Filed: Feb. 16, 2023

(65) Prior Publication Data

US 2023/0195895 A1 Jun. 22, 2023

Related U.S. Application Data

(63) Continuation of application No. 17/119,707, filed on Dec. 11, 2020, now Pat. No. 11,609,987, which is a continuation of application No. 15/637,455, filed on Jun. 29, 2017, now Pat. No. 10,909,239.

(51) Int. Cl.
*G06F 21/55* (2013.01)
*G06F 21/56* (2013.01)
*G06F 21/62* (2013.01)

(52) U.S. Cl.
CPC .......... *G06F 21/554* (2013.01); *G06F 21/552* (2013.01); *G06F 21/566* (2013.01); *G06F 21/6218* (2013.01); *G06F 2221/034* (2013.01)

(58) Field of Classification Search
CPC .... G06F 21/565; G06F 21/568; G06F 21/566; G06F 21/554; G06F 21/56; H04L 63/1425; H04L 63/1416
See application file for complete search history.

(56) References Cited

U.S. PATENT DOCUMENTS

| | | | | |
|---|---|---|---|---|
| 9,251,343 | B1* | 2/2016 | Vincent | G06F 21/575 |
| 9,734,337 | B1* | 8/2017 | Patton | G06F 21/568 |
| 9,756,061 | B1* | 9/2017 | Roeh | H04L 63/1408 |
| 9,888,032 | B2* | 2/2018 | Dekel | G06F 21/60 |
| 10,102,374 | B1* | 10/2018 | Cohen | G06F 21/554 |
| 10,121,003 | B1* | 11/2018 | Adams | G06F 21/565 |
| 10,503,897 | B1* | 12/2019 | Striem-Amit | G06F 21/552 |
| 2015/0058987 | A1* | 2/2015 | Thure | G06F 21/565 726/23 |
| 2015/0150130 | A1* | 5/2015 | Fiala | G06F 21/566 726/23 |
| 2015/0235025 | A1* | 8/2015 | Mundy | G06F 21/565 726/23 |
| 2016/0378988 | A1* | 12/2016 | Bhashkar | G06F 21/566 726/24 |

(Continued)

*Primary Examiner* — Tae K Kim

(57) ABSTRACT

Examples of the present disclosure describe systems and methods for providing advanced file modification heuristics. In aspects, software content is selected for monitoring. The monitoring comprises determining when the software content performs file accesses that are followed by read and/or write operations. The read/write operations are analyzed in real-time to determine whether the software content is modifying file content. If the monitoring indicates the software content is modifying accessed files, mathematical calculations are applied to the read-write operations to determine the nature of the modifications. Based on the determined nature of the file modifications, the actions of the software content may be categorized and halted prior to completion; thereby, mitigating malicious cyberattacks and/or unauthorized accesses.

21 Claims, 4 Drawing Sheets

(56) References Cited

U.S. PATENT DOCUMENTS

| | | | |
|---|---|---|---|
| 2017/0085585 A1* | 3/2017 | Morkovský | G06F 21/316 |
| 2017/0093886 A1* | 3/2017 | Ovcharik | H04L 9/002 |
| 2017/0364681 A1* | 12/2017 | Roguine | G06F 21/554 |
| 2018/0034835 A1* | 2/2018 | Iwanir | H04L 63/1416 |
| 2018/0048658 A1* | 2/2018 | Hittel | G06F 21/565 |
| 2018/0075234 A1* | 3/2018 | Boutnaru | G06F 21/554 |
| 2018/0075239 A1* | 3/2018 | Boutnaru | G06F 21/60 |
| 2018/0096145 A1* | 4/2018 | Krejdl | G06F 21/563 |
| 2018/0107824 A1* | 4/2018 | Gibbons, Jr. | G06F 21/565 |
| 2018/0121650 A1* | 5/2018 | Brown | G06F 21/568 |
| 2018/0211038 A1* | 7/2018 | Breiman | G06F 11/1451 |
| 2018/0349612 A1* | 12/2018 | Harel | G06F 11/0793 |
| 2018/0351969 A1* | 12/2018 | MacLeod | H04L 63/0236 |
| 2019/0228153 A1* | 7/2019 | Scaife | G06F 21/6218 |
| 2019/0347415 A1* | 11/2019 | Yavo | G06F 21/53 |

\* cited by examiner

ADVANCED FILE MODIFICATION HEURISTICS

CROSS-REFERENCE TO RELATED APPLICATIONS

This application is a continuation of and claims a benefit of priority under 35 U.S.C. 120 of, U.S. patent application Ser. No. 17/119,707, filed Dec. 11, 2020, issued as U.S. Pat. No. 11,609,987 and entitled "Advanced File Modification Heuristics," which is a continuation of, and claims a benefit of priority under 35 U.S.C. 120 of, U.S. patent application Ser. No. 15/637,455, filed Jun. 29, 2017, issued as U.S. Pat. No. 10,909,239 and entitled "Advanced File Modification Heuristics," which are incorporated herein for all purposes.

BACKGROUND

Cyberattacks are deliberate exploitations of computer systems, infrastructures and networks. Such exploitations often include the access, modification and/or destruction of sensitive information. There are several motivations and corresponding techniques for performing cyberattacks. As one example, financially-motivated cyberattacks often utilize malicious software configured to perform the mass encryption of a victim's data using cryptographic algorithms and compression techniques. The victim's data is, thus, effectively held captive by an attacker. Conventional cybersecurity approaches have been ineffective in preventing such attacks.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for providing advanced file modification heuristics. In aspects, software content is selected for monitoring. The monitoring comprises determining when the software content performs file accesses that are followed by read and/or write operations. The read/write operations are analyzed in real-time to determine whether the software content is modifying file content. If the monitoring indicates the software content is modifying accessed files, mathematical calculations are applied to the read-write operations to determine the nature of the modifications. Based on the determined nature of the file modifications, the actions of the software content may be categorized and halted prior to completion; thereby, mitigating malicious cyberattacks and/or unauthorized accesses.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
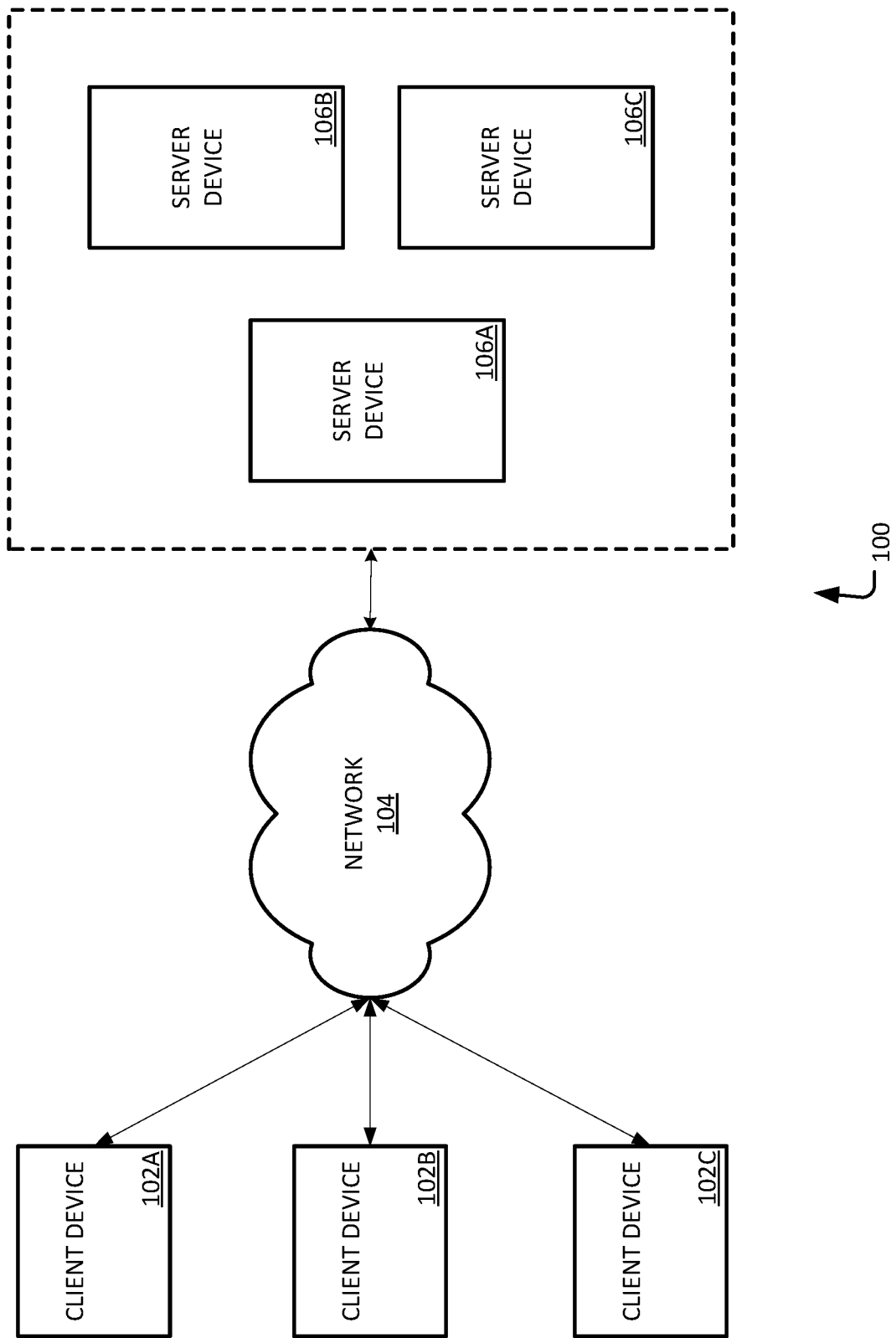
FIG. 1 illustrates an overview of an example system for implementing advanced file modification heuristics as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describes systems and methods for implementing advanced file modification heuristics. In aspects, software content may be selected for monitoring. Software content, as used herein, may refer to software programs or applications, a service, code segments, code libraries, a set of instructions, sets of module or procedures, and the like. The monitoring may employ the use of one or more monitoring tools and/or debugging utilities. In examples, the monitoring may be applied to one or more event files, I/O logs or kernel-mode components, such as a file system filter driver. Such monitoring may comprise determining when the software content accesses one or more files, and whether the file accesses are followed by read and/or write operations (e.g., a read/write chain or read/write chain of operations). In some aspects, read/write operations are detected and analyzed in real-time using advanced file modification heuristics. The advanced file modification heuristics may include I/O block analysis, cumulative read/write analyses, I/O offset comparisons, I/O sequence analysis, and the like. The advanced file modification heuristics identify whether the software content is modifying the accessed files or file content.

In aspects, when the monitoring indicates the software content is modifying accessed files, mathematical calculations and/or analyses are applied to the read/write operations to determine the nature of the modifications. For example, mathematical analyses may be used to determine whether software content is using compression, encryption, and/or encoding, to evaluate randomness in accessed files, etc. Examples of such mathematical analyses include, but are not limited to, Shannon Entropy, Pearson's chi-squared test, and Monte Carlo methods. For example, Shannon Entropy may be used to provide an absolute limit on the best possible average length of lossless encoding or compression of an information source. Pearson's chi-squared test is a statistical test applied to sets of categorical data to evaluate the probability that any observed difference between the sets of categorical data arose by chance. Monte Carlo methods are a class of computational algorithms that repeat random samplings to obtain numeric results. Based on the determined nature of the file modifications, the actions of the software content may be categorized using, for example, a label, a score, a confidence value, or the like. The categorization may provide for pausing or terminating the read/write operations and/or subsequent software content action. As such, applying the advanced file modification heuristics to the read/write operations of the software content may mitigate the malicious and/or unauthorized access and modification of files and similar content.

Accordingly, the present disclosure provides a plurality of technical benefits including but not limited to: applying file modification heuristics to file system filter driver data and metadata; providing real-time analysis and correlation of I/O operations; performing real-time I/O analysis without regard to data type and content of files; identifying types of file modifications and labeling software action based thereupon; pausing/terminating malicious software actions using file I/O operations; increasing security for online interactions; reduced malware exposure (and, thus, increased processing speed and CPU utilization); and improved efficiency and quality for applications/services utilizing examples of the present disclosure, among other examples.

FIG. 1 illustrates an overview of an example system for providing advanced file modification heuristics as described herein. Example system 100 presented is a combination of interdependent components that interact to form an integrated whole for automatic inline detection systems. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the example operating environments depicted in FIG. 4. In other examples, the components of systems disclosed herein may be spread across multiple devices. For instance, input may be entered on a client device and information may be processed or accessed from other devices in a network, such as one or more server devices.

As one example, the system 100 comprises client devices 102A-C, distributed network 104, and distributed server environment comprising server devices 106A-C. One of skill in the art will appreciate that the scale of systems such as system 100 may vary and may include more or fewer components than those described in FIG. 1. In some examples, interfacing between components of the system 100 may occur remotely, for example where components of system 100 may be spread across one or more devices of a distributed network.

In aspects, client devices 102A-C may comprise, or be configured to access, data content. Example data content may include voice, visual, touch and text data. The data content may correspond to one or more files or documents stored locally by client devices 102A-C, or accessed remotely on server devices 106A-C via distributed network 104. Client devices 102A-C may further comprise, or be accessible by, software content, such as software programs or applications. In examples, client devices 102A-C may enable the software content to access the data content. Accessing the data content may comprise performing one or more input/output (I/O) operations on the data content. Client devices 102A-C may monitor and/or record the I/O operations associated with the software content. The monitoring may include the use of debugging utilities and/or monitoring tools, such as file system filter drivers. The recorded I/O operations may be analyzed using advanced file modification heuristics. The advanced file modification heuristics may be installed on client devices 102A-C, or may be remotely accessed by client devices 102A-C using one or more interfaces (e.g., APIs, user interfaces (UIs), etc.). In aspects, the advanced file modification heuristics may be operable to analyze one or more sequences of I/O operations (I/O chains) in real-time to determine whether the software content is modifying the data content. Analyzing an I/O chain may include determining the nature of the first I/O block in the I/O chain in order to evaluate whether the software content is reading the entire data content (e.g., file). Analyzing an I/O chain may also include comparing the size of the cumulative read against the size of the cumulative write to determine whether compression is being used. Analyzing an I/O chain may further include evaluating the offsets of the I/O operations, and/or evaluating the chronological sequence of I/O operations to classify the software content type.

In aspects, client devices 102A-C may use the advanced file modification heuristics to determine that the software content is attempting to modify the data content. As a result, client devices 102A-C may apply one or more mathematical analyses to the I/O operations associated with the attempted modification. In examples, Shannon Entropy may be used to calculate the difference between the read operations and write operations executed (or attempting to be executed) by the software content. The difference may be used to determine whether the software content is attempting to encrypt, compress or encode the data content. Client devices 102A-C may then apply Pearson's chi-squared test to the I/O operations to generate a richer determination of randomness in the read operations and write operations to distinguish between use of compression, encryption and encoding. In some examples, client devices 102A-C may further apply Monte Carlo methods to the I/O operations as an additional check for randomness in the data content. Based on the result of the mathematical analyses, client devices 102A-C may categorize the software content (and/or actions and instructions thereof) using, for example, a label, a score, a confidence value, or the like. Categorizing the software content may include comparing categorized data (e.g., labels, scores, confidence values, etc.) to a list of known malicious or non-malicious content, evaluating categorized data against a rule set or model, comparing categorized data to a threshold value, etc. In aspects, the categorizations may provide for pausing or terminating the read/write operations of the software content, restricting access to the data content, or suppressing functionality available to the software content.

Figure 2:
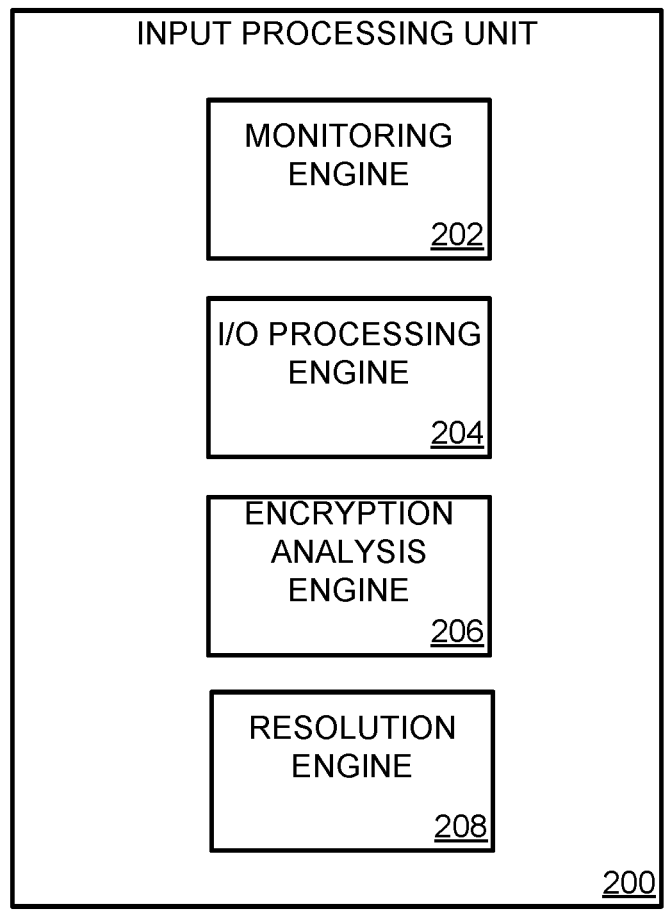
FIG. 2 illustrates an example input processing unit for implementing advanced file modification heuristics as described herein.

FIG. 2 illustrates an overview of an example input processing device 200 for implementing advanced file modification heuristics, as described herein. The advanced file modification heuristics techniques implemented by input processing device 200 may comprise the advanced file modification heuristics techniques and content described in FIG. 1. In alternative examples, a single system (comprising one or more components such as processor and/or memory) may perform processing described in systems 100 and 200, respectively.

With respect to FIG. 2, input processing unit 200 may comprise monitoring engine 202, I/O processing engine 204, encryption analysis engine 206, and resolution engine 208. Monitoring engine 202 may be configured to monitor software content interfacing with input processing unit 200. In aspects, a set of software content may access, or be accessible to, input processing unit 200. The software content may be installed locally to input processing unit 200, or remotely on one or more computing devices. The decision to monitor software content may be made manually or automatically. Input processing unit 200 may additionally have access to a set of data content. The data content may be stored locally to input processing unit 200, or remotely on one or more computing devices. Input processing unit 200 may enable at least a portion of the software content to access at least a portion of the data content. Monitoring engine 202 may monitor the interaction between the software content and data content. In examples, the monitoring may comprise utilizing one or more monitoring tools and/or debugging utilities, and may be applied to one or more event files, I/O logs, or kernel-mode components. In some aspects, monitoring engine 202 may record and/or collect detected interactions based on one or more criteria. For example, criteria may specify that monitoring engine 202 is to collect detected I/O operations when read operations and/or write operations are detected. As another example, criteria may specify that monitoring engine 202 is to collect detected I/O operations when a particular application/program attempts to access data content.

I/O processing engine 204 may be configured to process I/O operations. In aspects, I/O processing engine 204 may have access to I/O operations collected and/or stored by monitoring engine 202. I/O processing engine 204 may also have access to one or more sets of advanced file modification heuristics. The advanced file modification heuristics may be stored locally to input processing unit 200, or remotely on one or more remote computing devices. I/O processing engine 204 may apply advanced file modification heuristics to the collected I/O operations to determine the nature of the action(s) intended by the software content. In aspects, applying the advanced file modification heuristics may include identifying one or more sequences of I/O operations. I/O processing engine 204 may analyze the identified sequences of I/O operations in real-time to determine whether the software content is modifying (or facilitating the modification of) the data content. As one example, analyzing sequences of I/O operations may include determining the nature of the first I/O block in a sequence of I/O operations in order to evaluate whether the software content is reading the entirety of the data content (a prerequisite for utilizing dictionary-based compression algorithms). As another example, analyzing sequences of I/O operations may include comparing the size of a cumulative read against the size of a cumulative write to determine whether compression is being used. As yet another example, analyzing sequences of I/O operations may include evaluating the offsets of the I/O operations to determine the nature of the software content (or the actions/instruction thereof), and/or evaluating the chronological sequence of I/O operations to classify the software content type. In such examples, I/O processing engine 204 may record (or otherwise provide an indication of) the techniques used to analyze sequences of I/O operations, and the results thereof.

Encryption analysis engine 206 may be configured to evaluate I/O operations intended to modify data content. In aspects, encryption analysis engine 206 may have access to the I/O operations analyzed by I/O processing engine 204 and/or corresponding results. Encryption analysis engine 206 may identify the I/O operations (or I/O chains) that are modifying (or attempting to modify) data content. Encryption analysis engine 206 may then apply one or more mathematical calculations to the identified I/O operations. For example, encryption analysis engine 206 may apply the Shannon Entropy equation to the identified I/O operations. Shannon Entropy may be used to calculate the difference between the read operations and write operations executed (or attempting to be executed) by the software content. The difference may be used to determine whether the software content is attempting to encrypt or compress the data content. For instance, if the size of the data read from the data content (or a storage location comprising the data content) is larger than the data written back to the data content (or to the storage location comprising the data content), an inference may be made that the software content is encrypting or compressing the content data. As another example, encryption analysis engine 206 may apply Pearson's chi-squared test to the I/O operations, or to the results of the Shannon Entropy equation, to determine the randomness in the read operations and write operations therein. This determination may provide for distinguishing with a certain degree of confidence whether the software content is utilizing compression or encryption techniques. As yet another example, encryption analysis engine 206 may apply Monte Carlo methods to the I/O operations (or the results of one or more mathematical analyses) as an additional check for randomness in the data content. For instance, as the content of an encrypted file is generally more random (with respect to byte frequency and or location) than the content of an unencrypted file, the determined randomness of data content may be compared to a randomness threshold to determine whether the data content is encrypted or compressed. Additionally or alternately, the determined randomness of data content may be used to determine the type/category of encryption or compression being used by the software content.

Resolution engine 208 may be configured to perform one or more actions. In aspects, resolution engine 208 may use the analysis and/or determinations of encryption analysis engine 206 to perform one or more actions related to the monitored software content. For example, resolution engine 208 may categorize the actions/instructions of the software content according to the processing/analysis of one or more of the other components of input processing unit 200. Such categorizations may designate read/write operations, compression, and/or encryption, types of compression/encryption, etc. As another example, resolution engine 208 may generate a label designating whether the actions/instructions of the software content are malicious. Generating the label may include comparing the actions/instructions to a set of known actions/instructions (e.g., a white list, a black list, etc.), evaluating a permission set, determining confidence metrics for the actions/instructions, comparing confidence metrics to one or more thresholds, and/or applying confidence metrics to one or more rule sets. As yet another example, resolution engine 208 may generate a notification or warning, and present the generated notification/warning to a user via an interface. The warning may include one or more labels, confidence values, and/or suggested remedies. As still yet another example, resolution engine 208 may automatically perform mitigating actions, such as pausing or terminating the read/write operations of the software content, restricting access to the data content, or suppressing functionality available to the software content.

Having described various systems that may be employed by the aspects disclosed herein, this disclosure will now describe various methods that may be performed by various aspects of the disclosure. In aspects, method 300 may be executed by an example system such as system 100 of FIG. 1. In examples, method 300 may be executed on a device comprising at least one processor configured to store and execute operations, programs or instructions. However, method 300 is not limited to such examples. In other examples, method 300 may be performed on an application or service for identifying anomalous network behavior. In at least one example, method 300 may be executed (e.g., computer-implemented operations) by one or more components of a distributed network, such as a web service/ distributed network service (e.g., cloud service).

Figure 3:
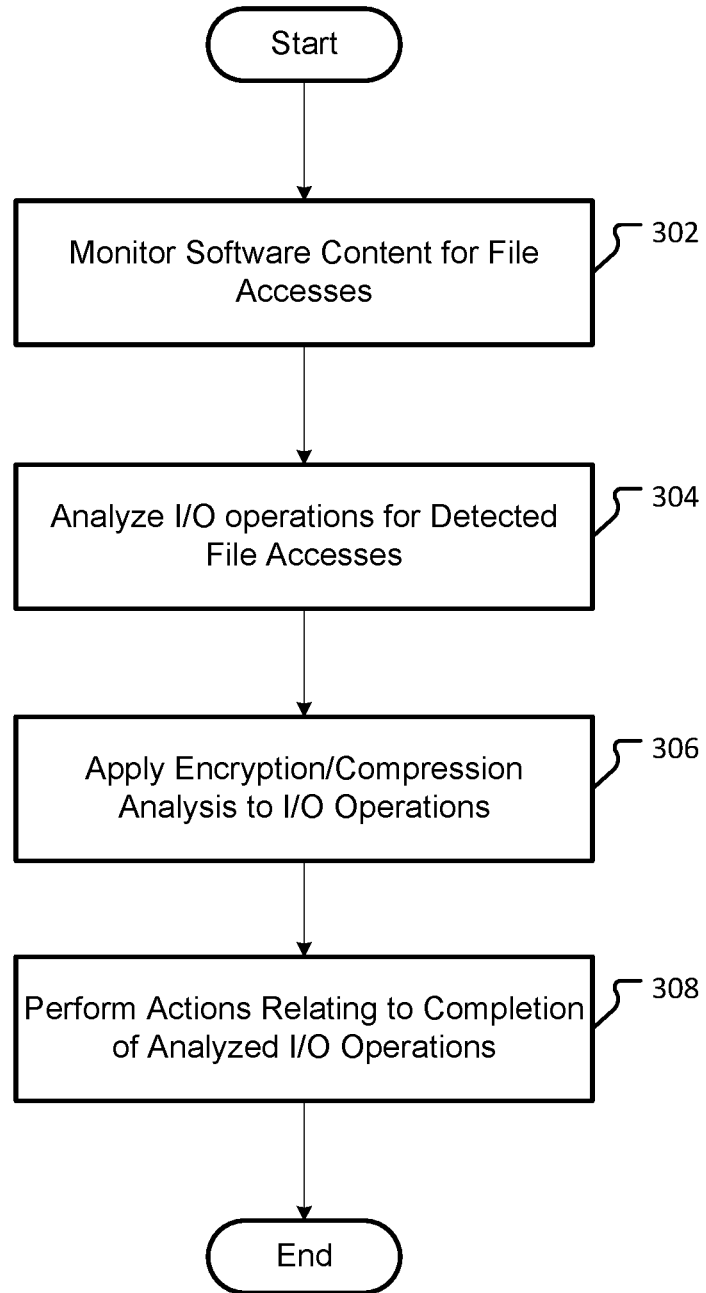
FIG. 3 illustrates an example method for implementing advanced file modification heuristics as described herein.

FIG. 3 illustrates an example method 300 of implementing advanced file modification heuristics as described herein. Example method 300 begins at operation 302, where software content may be monitored. In aspects, software content may be installed locally in a computing environment, such as input processing unit 200, or remotely to the computing environment. Monitoring components, such as monitoring engine 202, may be configured to monitor the interactions between the software content and data content. In examples, the monitoring of software content may be determined and assigned manually via, for example, one or more interfaces accessible to the computing environment, or automatically according to one or more criteria. For example, criteria may specify that software content is to be automatically monitored based on the implementation location of the software content. As another example, criteria may specify that software content operated by any user other than an administrator is to be automatically monitored. In aspects, monitoring the interactions may comprise applying one or more monitoring tools and/or debugging utilities to one or more event files, I/O logs, or kernel-mode components. For example, a monitoring utility may monitor data and metadata produced by a file system filter driver. A file system filter driver, as used herein, may refer to a kernel-mode component that is operable to filter (e.g., log, observe, modify, prevent, etc.) I/O operations for one or more file systems or portions thereof. The monitoring utility may collect parse and/or collect file system filter driver data associated with file accesses of data content by monitored software content.

At operation 304, I/O operations of monitored software content may be analyzed. In aspects, the I/O operations of monitored software content may be aggregated and/or analyzed in real-time using a processing component, such as I/O processing engine 204. The analysis may comprise applying advanced file modification heuristics to the I/O operations to determine the nature of the software content and/or the action(s) intended by the software content. In examples, applying the advanced file modification heuristics may comprise identifying one or more sequences of I/O operations, identifying the read and write operations that make up the I/O operations, and mapping or identifying the sequential flow of the read and write operations through the execution path of the I/O operations. The analysis of sequences of I/O operations may facilitate determining whether software content is modifying (or facilitating the modification of) data content. As an example, analyzing sequences of I/O operations may include determining the nature of the first I/O block in a sequence of I/O operations in order to evaluate whether the software content is reading the entirety of the data content. If no read operation is identified in the first I/O block (or it is otherwise determined that the software content is reading the entirety of the data content), one or more conclusions may be generated and/or analysis steps may be skipped or terminated. For instance, as dictionary-based compression algorithm may necessarily require reading the data of an entire file prior to performing compression, determining that no such read operation is present in the first I/O block in a sequence of I/O operation may lead to a determination that dictionary-based compression algorithms are not being used by the software content. As another example, analyzing sequences of I/O operations may include comparing the size of a cumulative read against the size of a cumulative write to determine whether compression is being used. For instance, if the analysis indicates that the size of a cumulative read is larger than the size of a corresponding cumulative write, the software content may be using compression techniques. Conversely, if the analysis indicates that the size of a cumulative read is approximately the same size or smaller than the size of a corresponding cumulative write, encryption techniques may be being used. As yet another example, analyzing sequences of I/O operations may include evaluating the offsets of the I/O operations to determine the nature of the software content (or the actions/instruction thereof), and/or evaluating the chronological sequence of I/O operations to classify the software content type. In such examples, if the analysis of the I/O operations indicates that software content is not attempting to modify data content, the analysis may be terminated and/or no further advanced file modification heuristics may be applied to the I/O operations. However, if the analysis of the I/O operations indicates that software content is attempting to modify data content, flow may proceed to operation 306.

$$\text{Fractional Frequency } 'F' \text{ of byte } 'b' = \frac{(\text{Frequency of byte } 'b')}{(\text{Size of data})}$$

At operation 306, an encryption/compression analysis may be applied to I/O operations. In aspects, I/O operations indicating that software content is attempting to modify data content may be provided or applied to an encryption/ compression analysis component, such as encryption analysis engine 206. The encryption/compression analysis component may apply one or more mathematical calculations to the I/O operations. Applying the mathematical calculations may include the use of one or more mathematical models or equations. The mathematical models or equations may be stored and applied by the local computing environment, a remote computing environment, or some combination thereof. For instance, a set of mathematical models stored in a cloud computing environment may be accessed by a local computing environment using one or more APIs or similar functionality. The I/O operations may be provided to, and processed by, the mathematical models/equations of the cloud computing environment, and the results may be provided to the local computing environment. Examples of mathematical models or equations include, but are not limited to, Shannon Entropy, Chi-squared tests, and Monte Carlo methods. For example, Shannon Entropy may be applied to a set of I/O operations to calculate the difference between the read operations and write operations executed (or attempting to be executed) by the software content. The difference may be used to determine whether the software content is attempting to encrypt or compress the data content. In this respect, Shannon Entropy may be expressed by:

$$\text{Fractional Frequency } 'F' \text{ of byte } 'b' = \frac{(\text{Frequency of byte } 'b')}{(\text{Size of data})}$$

$$\text{Shannon Entropy } 'H' = \sum_{b=0}^{225} (F * \log_2(F))$$

In this expression, 'H' (the degree on entropy in the data content) may be compared to threshold compression/encryption value. If 'H' is not large enough to exceed the threshold compression/encryption value, an inference may be made that the software content is not compressing or encrypting the content data. As another example, a Chi-squared test may be applied a set of I/O operations, or to the results of the Shannon Entropy analysis, to determine the randomness of the read operations and write operations in the set of I/O operations. In this respect, the Chi-squared test may be expressed by:

$$\text{Expected Frequency } 'E' = \frac{(\text{Size of data})}{256}$$

$$\text{Chi-square value } 'C' = \sum_{b=0}^{255} \frac{(\text{Frequency of byte } 'b' - E)^2}{E}$$

This randomness determination may provide for distinguishing with a certain degree of confidence whether the software content is utilizing compression or encryption techniques. For instance, the calculated Chi-square value may be evaluated against a rule set or one or more thresholds for determining compression and/or encryption usage. The evaluation may include determining a type of compression or encryption being used, generating a randomness metric (or a corresponding label) indicating a confidence in the Chi-square value, etc. As yet another example, Monte Carlo methods may be applied a set of I/O operations, or to the results of the Shannon Entropy and/or Chi-squared analyses, as an additional check for randomness in the data content. In this respect, a Monte Carlo equation may be expressed by:

For each byte $'b'$:

1. byte $'b' = 0xb_1b_2b_3b_4b_5b_6b_7b_8$

2. $X_b = \left(\frac{b_1b_2b_3b_4}{15}\right) - 0.5$ $Y_b = \left(\frac{b_5b_6b_7b_8}{15}\right) - 0.5$ 3. $Z_b = (X_b * X_b) + (Y_b * Y_b)$ 4. If $Z_b \leq 0.25$, count++

5. Monte Carlo value $'M' = \frac{\text{count} * 4}{\text{Number of bytes}}$

This additional randomness determination may provide for further distinguishing whether the software content is utilizing compression or encryption techniques. As a particular example, the Monte Carlo Method for pi utilizes a sequence of random numbers to approximate the value of pi. The Monte Carlo Method for pi may be applied to software content, and a value (e.g., an approximation) indicative of randomness in the software content may be generated. In such an example, the closer the value is to pi, the more likely an encryption algorithm was applied to the software content. That is, the value is increasingly indicative of randomness (with respect to byte frequency and/or byte location) as it converges on the true value of pi. In some examples, a determined randomness value may be compared to a randomness threshold to determine whether software content is encrypted or compressed.

At operation 308, one or more actions may be performed in response to the encryption/compression analysis. In aspects, analysis data indicating whether software content is attempting to encrypt, or compression data content may be accessible to an action-performing component, such as resolution engine 208. The action-performing component may initiate (or cause the initiation of) one or more actions associated with the software content based on the analysis data. For example, the action-performing component may acquire and execute commands (e.g., a script, a set of instructions or decision logic) against a set of analysis data. The executed command may be configured to categorize the actions/instructions of the software content associated with the analysis data. Such categorizing may facilitate the labeling of read/write operations, types of compression and/or encryption determinations, classifications of compression/encryption, software content classifications, etc. For instance, the action-performing component may categorize a file access by software content as an "encryption event," a "compression event," a "read-only event," or the like. As another example, the action-performing component may apply decision logic to analysis data to determine whether the actions/instructions of the software content are malicious. Generating the determination may include comparing the actions/instructions to a set of known actions/instructions (e.g., a white list, a black list, etc.), evaluating a permission set or user identity, determining a score/metric representing the confidence associated with the determination, comparing confidence metrics to one or more thresholds, and/or applying confidence metrics to one or more rule sets to generate labels (e.g., "malicious intent," "unauthorized attempt," "intent unknown," etc.), among other actions. As yet another example, the action-performing component may cause a script or service for generating a notification or warning to be applied to the analysis data. The notification/warning may include one or more labels, categorized data, confidence metrics, and/or suggested remedies. The notification/warning may be provided to a user, a service, an associated application or computing environment, or a combination thereof. In a particular example, the notification/warning may comprise actionable content. For instance, the notification/warning may comprise a button to dismiss the notification/warning, a link to view a detailed report of the notification/warning, a means to quarantine a set of instructions or software content, a means to the halt software content action, and the like. As still yet another example, the action-performing component may apply automatically perform mitigating actions based on the analysis data. Such mitigating actions may include pausing or terminating the read/write operations of the software content, restricting access to the data content, suppressing functionality available to the software content, restoring previous versions of data content, etc. In such an example, the action-performing component may execute and manage the actions, or the action-performing component may cause a separate component or service to execute and manage the actions.

Figure 4:
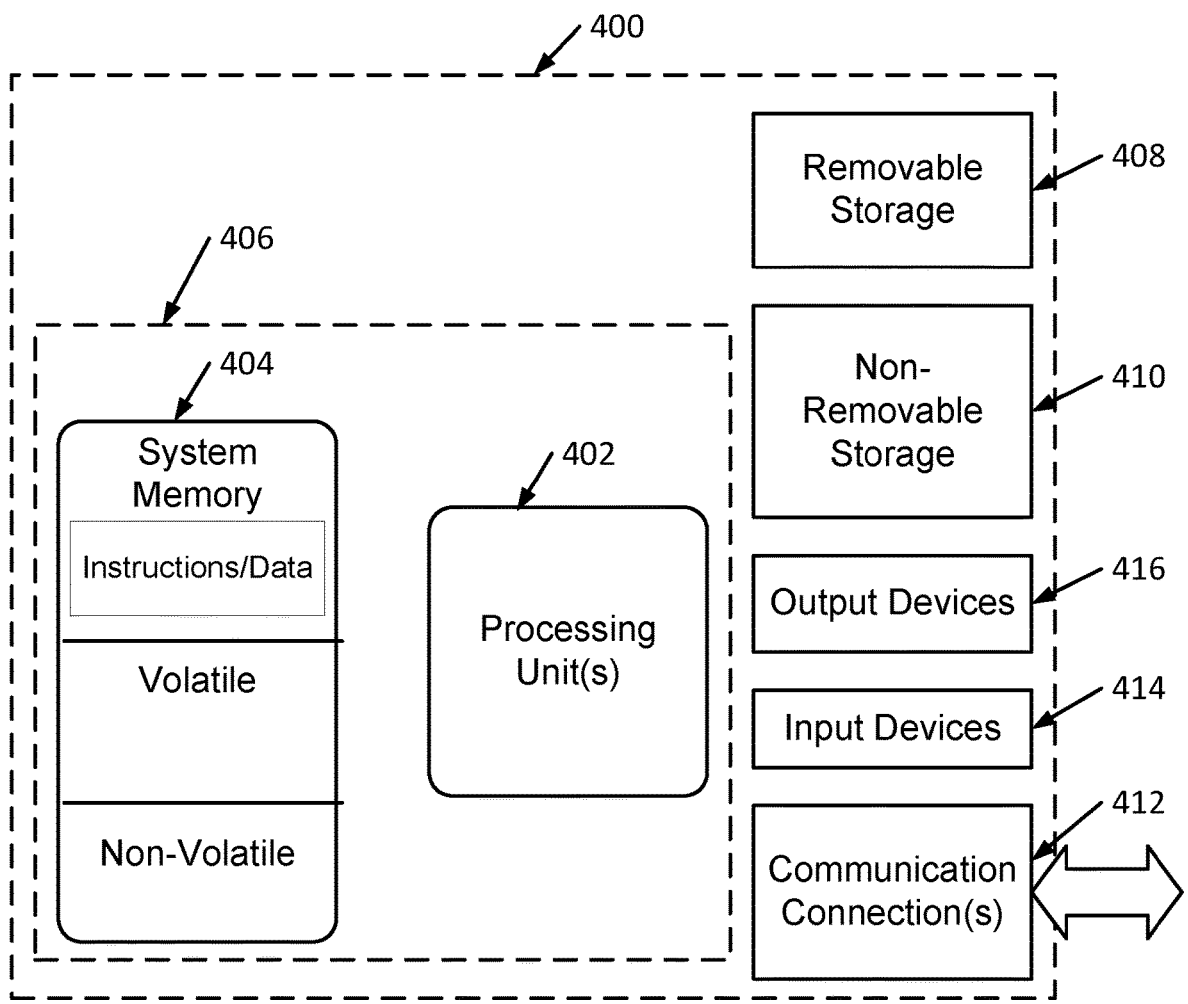
FIG. 4 illustrates one example of a suitable operating environment in which one or more of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, reputation information, category information, cached entries, instructions to perform the methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   a processor; and
   a non-transitory computer readable media storing instructions that are executable by the processor for:
   obtaining monitoring results of monitoring of selected software content, the monitoring results indicating that the selected software content performs accesses of data content followed by input/output (I/O) operations on the data content;
   analyzing, in real time, actions of the I/O operations to determine whether the actions of the I/O operations are modifying the data content, wherein the analyzing of the actions excludes any evaluation of the data content on which the I/O operations are performed;
   responsive to determining that the actions of the I/O operations are modifying the data content, determining a categorization of the actions of the I/O operations; and
   responsive to determining the categorization, determining in real time whether to halt the actions of the I/O operations prior to completion.

2. The system of claim 1, wherein the instructions are executable by the processor for:
   selecting the selected software content for monitoring.

3. The system of claim 1, wherein the monitoring of the selected software content includes monitoring an event file.

4. The system of claim 1, wherein the accesses of data content comprise an access of a file, wherein the I/O operations on the data content comprise I/O operations on the accessed file.

5. The system of claim 1, wherein determining the categorization of the actions of the I/O operations comprises determining whether the actions of the I/O operations comprise data compression or data encryption.

6. The system of claim 1, wherein the instructions are executable by the processor for:
restoring a previous version of the data content.

7. The system of claim 1, wherein determining the categorization of the actions of the I/O operations comprises evaluating randomness in accessed data content.

8. A method, comprising:
obtaining monitoring results of monitoring of selected software content, the monitoring results indicating that the selected software content performs accesses of data content followed by input/output (I/O) operations on the data content;
analyzing, in real time, actions of the I/O operations to determine whether the actions of the I/O operations are modifying the data content, wherein the analyzing of the actions excludes any evaluation of the data content on which the I/O operations are performed;
responsive to determining that the actions of the I/O operations are modifying the data content, determining a categorization of the actions of the I/O operations; and
responsive to determining the categorization, determining in real time whether to halt the actions of the I/O operations prior to completion.

9. The method of claim 8, further comprising:
selecting the selected software content for monitoring.

10. The method of claim 8, wherein the monitoring of the selected software content includes monitoring an event file.

11. The method of claim 8, wherein the accesses of data content comprise an access of a file, wherein the I/O operations on the data content comprise I/O operations on the accessed file.

12. The method of claim 8, wherein determining the categorization of the actions of the I/O operations comprises determining whether the actions of the I/O operations comprise data compression or data encryption.

13. The method of claim 8, further comprising:
restoring a previous version of the data content.

14. The method of claim 8, wherein determining the categorization of the actions of the I/O operations comprises evaluating randomness in accessed data content.

15. A non-transitory computer readable medium, comprising instructions for:
obtaining monitoring results of monitoring of selected software content, the monitoring results indicating that the selected software content performs accesses of data content followed by input/output (I/O) operations on the data content;
analyzing, in real time, actions of the I/O operations to determine whether the actions of the I/O operations are modifying the data content, wherein the analyzing of the actions excludes any evaluation of the data content on which the I/O operations are performed;
responsive to determining that the actions of the I/O operations are modifying the data content, determining a categorization of the actions of the I/O operations; and
responsive to determining the categorization, determining in real time whether to halt the actions of the I/O operations prior to completion.

16. The non-transitory computer readable medium of claim 15, wherein the instructions are for:
selecting the selected software content for monitoring.

17. The non-transitory computer readable medium of claim 15, wherein the monitoring of the selected software content includes monitoring an event file.

18. The non-transitory computer readable medium of claim 15, wherein the accesses of data content comprise an access of a file, wherein the I/O operations on the data content comprise I/O operations on the accessed file.

19. The non-transitory computer readable medium of claim 15, wherein determining the categorization of the actions of the I/O operations comprises determining whether the actions of the I/O operations comprise data compression or data encryption.

20. The non-transitory computer readable medium of claim 15, wherein the instructions are for:
restoring a previous version of the data content.

21. The non-transitory computer readable medium of claim 15, wherein determining the categorization of the actions of the I/O operations comprises evaluating randomness in accessed data content.

* * * * *